US009252929B2

(12) United States Patent
Liu et al.

(10) Patent No.: US 9,252,929 B2
(45) Date of Patent: Feb. 2, 2016

(54) METHOD FOR ACHIEVING RENDEZVOUS FOR COGNITIVE RADIO NETWORKS

(71) Applicant: Hong Kong Baptist University, Kowloon (HK)

(72) Inventors: Hai Liu, Kowloon (HK); Zhiyong Lin, Kowloon (HK); Xiaowen Chu, Kowloon (HK); Yiu-Wing Leung, Kowloon (HK)

(73) Assignee: Hong Kong Baptist University (HK)

( * ) Notice: Subject to any disclaimer, the term of this patent is extended or adjusted under 35 U.S.C. 154(b) by 77 days.

(21) Appl. No.: 14/036,388

(22) Filed: Sep. 25, 2013

(65) Prior Publication Data

US 2015/0085817 A1    Mar. 26, 2015

(51) Int. Cl.
*H04W 4/00* (2009.01)
*H04L 5/00* (2006.01)

(52) U.S. Cl.
CPC .................................. *H04L 5/0012* (2013.01)

(58) Field of Classification Search
CPC ................................ H04L 5/00; H04L 5/0012
See application file for complete search history.

(56) References Cited

U.S. PATENT DOCUMENTS

2011/0249664 A1*  10/2011  Chou et al. ............... 370/345
2011/0255448 A1*  10/2011  Hartman et al. .......... 370/277
2013/0202013 A1*   8/2013  Van Stralen et al. ..... 375/133

OTHER PUBLICATIONS

Zhiyong Lin, et al., Enhanced Jump-Stay Rendezvous Algorithm for Cognitive Radio Networks, IEEE Communications Letters, Sep. 2013, 1742-1745, vol. 17, No. 9, IEEE Communications Society.

* cited by examiner

*Primary Examiner* — Kan Yuen
(74) *Attorney, Agent, or Firm* — Renner Kenner; Greive Bobak; Taylor & Weber

(57) ABSTRACT

A method for achieving rendezvous in a multiple access network having two or more access channels includes the steps of generating channel access sequences in rounds for each user of the multiple access network, wherein each round includes at least one jump-pattern and at least one stay-pattern, performing the at least one jump-pattern alternated by the at least one stay-pattern in each round, and whereupon the at least one jump-pattern alternated by the stay-pattern in each round are performed, continuously generate at least one channel access sequence rounds and perform the jump-pattern of the channel access sequence rounds until a user in the network achieves rendezvous with its intended neighbor user or users.

14 Claims, 8 Drawing Sheets

(a) Overlap of the first jump-patterns of the two users is at least P timeslots.

(b) Overlap of the first jump-patterns of the two users is less than P timeslots.

```
Function EJSHopping
1: Input: M, P, r, i, t
2: Output: channel index j
3: t=t mod 4P;           //each round takes 4P timeslots
4: if (t<3P)    j=((i+t×r−1) mod P)+1;   //jump pattern
5: else     j=r;                          //stay pattern
6: if (j>M)    j=((j−1) mod M)+1;   //remapping
7: return j;
```

FIGURE 1

```
Algorithm EJS
1: Input: M, C_k    //for the k^th user
2: P=the smallest prime number greater than M;
3: r=the index of a channel randomly selected from C_k;
4: i_0=the initial starting-index randomly selected from [1, P];
5: t=0;
6: while (not rendezvous)
7:    n=⌊t/(4P)⌋;  //each round has 4P timeslots
8:    i=((i_0+n−1) mod P)+1;  //switch starting-index every round
9:    j=EJSHopping(M, P, r, i, t);
10:   if (c_j ∉ C_k)         //replacement
            replace c_j by the ((j−1) mod |C_k|)+1)^th channel in C_k;
11:   t=t+1;
12:   Attempt rendezvous on channel c_j;
```

FIGURE 2

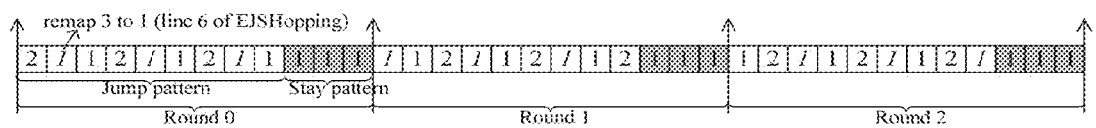
(a) User 1: initial starting-index $i_0$=2, step-length $r$=1.
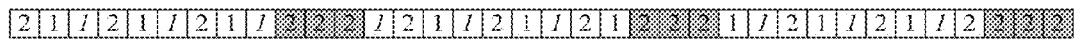
(b) User 1: initial starting-index $i_0$=2, step-length $r$=2.
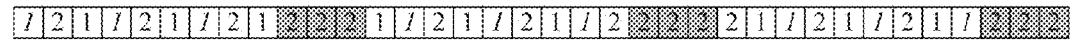
(c) User 2: initial starting-index $i_0$=3, step-length $r$=2.
FIGURE 3

(a) Stay-stay rendezvous (b) Jump-stay rendezvous

FIGURE 4

(a) Overlap of the first jump-patterns of the two users is at least P timeslots.

(b) Overlap of the first jump-patterns of the two users is less than P timeslots.

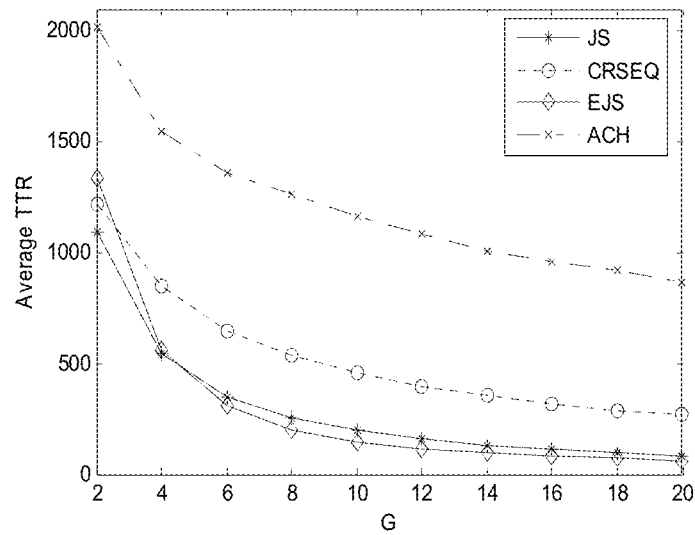
(a) Comparing average TTR.
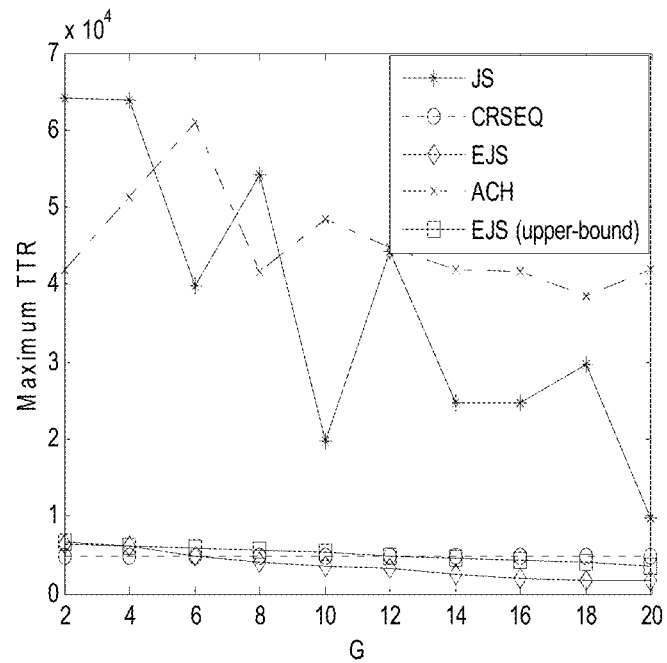
(b) Comparing MTTR.
FIGURE 6

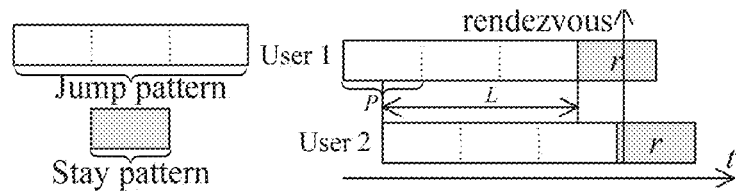
(a) $L>2P$; TTR$\leq 3P+1$.
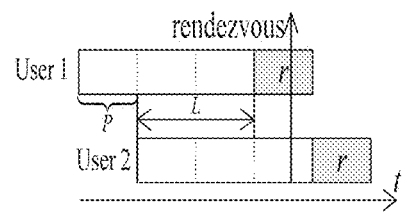
(b) $L\leq 2P$; TTR$\leq L+P\leq 3P$.
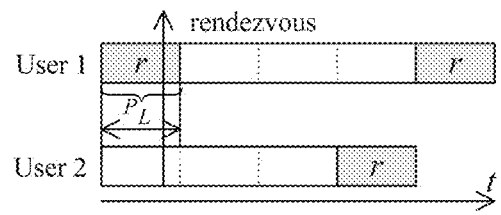
(c) $L=P$; TTR$\leq P$.
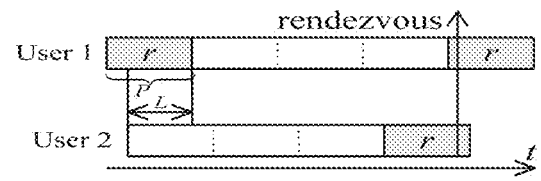
(d) $L<P$; TTR$\leq L+3P+1\leq 4P$.
FIGURE 7

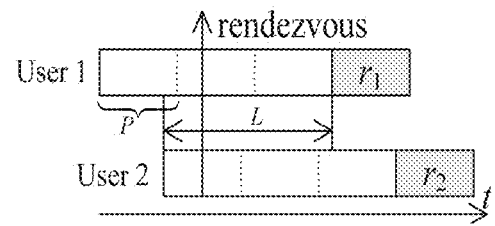
(a) $L≥P$; $TTR≤P$.
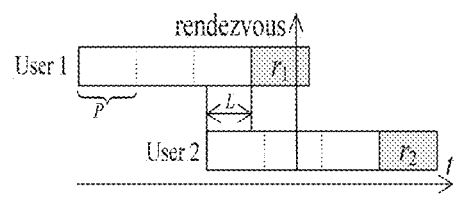
(b) $L<P$; $TTR≤L+P<2P$.
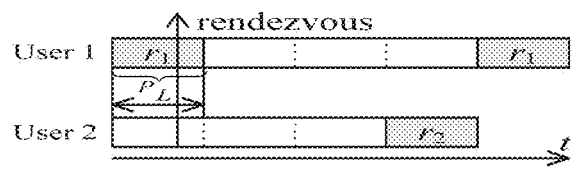
(c) $L=P$; $TTR≤P$.
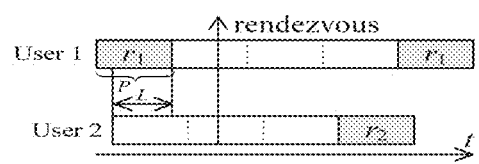
(d) $L<P$; $TTR≤L+P<2P$.
FIGURE 8

METHOD FOR ACHIEVING RENDEZVOUS FOR COGNITIVE RADIO NETWORKS

FIELD OF INVENTION

The present invention relates to method for achieving rendezvous for cognitive radio networks. In particular, the present invention relates to method for achieving rendezvous for cognitive radio networks using an enhanced jump-stay (EJS) rendezvous method.

BACKGROUND OF INVENTION

In a cognitive radio network (CRN), rendezvous refers to such a process that two users access a commonly available channel at the same time and thus establish a desired communication link. Rendezvous is a challenging problem since users are even not aware of the presence of each other before rendezvous and available channels of users may be different and change over time. Channel-hopping (CH) is a typical technique for the design of rendezvous methods. With CH technique, the network is assumed to be time-slotted. In each timeslot, a user hops on one of its available channels and attempts rendezvous with its potential neighbors. A rendezvous is said to be achieved if two users hop on the same channel in the same timeslot. Given a CH method, time-to-rendezvous (TTR) is defined as the number of timeslots that it takes for users to achieve rendezvous when all the users have begun their channel-hopping. MTTR (maximum TTR) and E(TTR) (expected TTR) are two most important metrics to evaluate CH methods.

SUMMARY OF INVENTION

Embodiments of the present invention include method for achieving rendezvous in a multiple access network, such as cognitive radio networks.

In a first embodiment, the present invention provides a method for achieving rendezvous in a multiple access network comprising of two or more access channels wherein the method further comprising of:
 a user generating channel access sequences in rounds, wherein each round comprising at least one jump-pattern and at least one stay-pattern;
 the user performs the jump-pattern first and then the stay-pattern in each round, and
 each user in the network continuously generates its channel access sequence rounds and performs them until it achieves rendezvous with its intended neighbour user.

In a second embodiment, the present invention provides a method for achieving rendezvous in a multiple access network wherein when the user generates the at least two patterns in each round, the jump-pattern lasts for at least 3P timeslots and the subsequent stay-pattern lasts for at least P timeslots, and wherein when the user performs the jump-pattern, the user starts with index i and keeps jumping/hopping/accessing in [1, P] with step-length of at least r by using modulo operations on P, and in the subsequent stay-pattern, the user stays in the channel r, which is the step-length of the respective round; such that P is the smallest prime number greater than M, wherein M is the size of the whole potential available channel set, r is an integer in [1, M] and i is an integer in [1, P].

In a third embodiment, the present invention provides a method for achieving rendezvous in a multiple access network wherein each user randomly selects step-length r from the indices of its available channels.

In a fourth embodiment, the present invention provides a method for achieving rendezvous in a multiple access network wherein the starting-index i is switched to the next number in at least every 4P timeslots in a round-robin fashion.

In a fifth embodiment, the present invention provides a method for achieving rendezvous in a multiple access network wherein if a channel computed by the method (say, $c_j$) does not belong to $C_k$, it is replaced by the $((j-1) \mod |C_k|)+1)^{th}$ channel in $C_k$ wherein $C_k$ denotes the set of channels available to user k.

In a sixth embodiment, the present invention is implementable in software and/or hardware, at one or across more than one location.

In a seventh embodiment, the present invention is a channel hopping multiple access network.

In an eighth embodiment of the present invention, there is provided an apparatus of achieving the rendezvous method of the present invention.

In another aspect of the present invention, there is provided a method for achieving rendezvous in a multiple access network having two or more access channels comprising the steps of: —generating channel access sequences in rounds for each user of the multiple access network, wherein each round includes at least one jump-pattern and at least one stay-pattern; performing the at least one jump-pattern alternated by the at least one stay-pattern in each round, and whereupon the at least one jump-pattern alternated by the stay-pattern in each round are performed, continuously generating at least one channel access sequence rounds and performing the jump-pattern of the channel access sequence rounds until a user in the network achieves rendezvous with its intended neighbour user or users.

In another aspect of the present invention, there is provided a system for achieving rendezvous in a multiple access network having two or more access channels comprising: —a channel access sequence generator arranged to generate channel access sequences in rounds for each user of the multiple access network, wherein each round includes at least one jump-pattern and at least one stay-pattern; —a processor arranged to perform the at least one jump-pattern alternated by the at least one stay-pattern in each round, and whereupon the at least one jump-pattern alternated by the stay-pattern in each round are performed, continuously generate at least one channel access sequence rounds and—a module arranged to perform the jump-pattern of the channel access sequence rounds until a user in the network achieves rendezvous with its intended neighbour user or users.

BRIEF DESCRIPTION OF DRAWINGS

The above and other objects and features of the present invention will become apparent from the following description of the invention, when taken in conjunction with the accompanying drawings, in which:

FIG. 1 shows the pseudo code of the EJSHopping function.

FIG. 2 shows the pseudo code of the EJS method.

FIG. 3 shows the Sample CH sequences of EJS. The numbers in italic are the channel indices computed by EJSHopping with the remapping operation (i.e., line 6 of FIG. 1).

FIG. 4 shows when the rendezvous is achieved if user 1 and user 2 adopt the CH sequences in FIG. 3(b) and FIG. 3(c), respectively (The two users have the same step-length).

FIG. 6 shows the average TTR and maximum TTR under the asymmetric model. GOS is not included since it is not applicable to the asymmetric model (see Table 1).

FIG. 7 shows the guaranteed rendezvous under the symmetric model: Two users adopt the same step-length, i.e., $r_1=r_2=r$.

FIG. 8 shows the guaranteed rendezvous under the symmetric model: Two users adopt different step-lengths, i.e., $r_1 \neq r_2$.

DETAILED DESCRIPTION OF INVENTION

Figure 5:
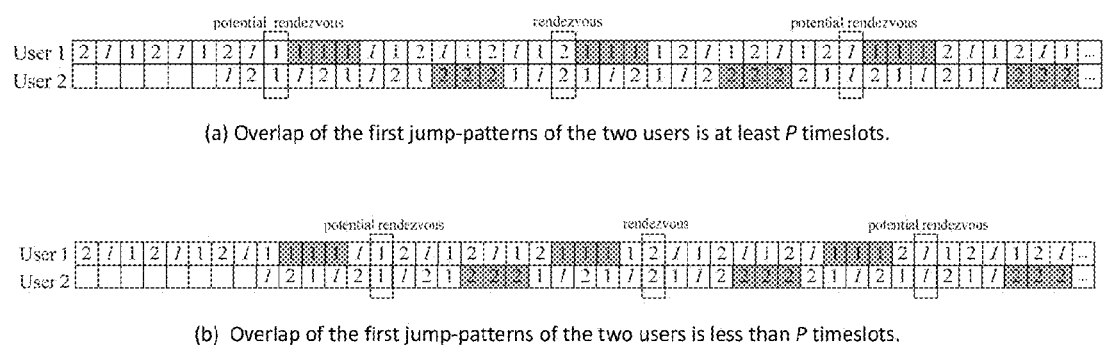
FIG. 5 shows when the rendezvous is achieved if user 1 and user 2 adopt the CH sequences in FIG. 3(a) and FIG. 3(c), respectively (The two users have different step-lengths).

By way of introducing the embodiments of the present invention, CH algorithms are hereby explained. Observations, research and trials are also made by the inventors are also described herein.

Without wishing to be bound by theory, the inventors through trials, research, study and review of experimental results is of the view that existing CH algorithms such as those found in a recent survey can be found in H. Liu, Z. Lin, X. Chu, and Y.-W. Leung, "Taxonomy and Challenges of Rendezvous Algorithms in Cognitive Radio Networks," in *Proc. of ICNC* 2012, Maui, Hi., USA, 30 Jan.-2 Feb. 2012, pp. 645-649 that the most notable works are in the following where the proposed algorithms achieve guaranteed rendezvous with short MTTR. Theis, Thomas, and DaSilva in N.C. Theis, R. W. Thomas, and L. A. DaSilva, "Rendezvous for Cognitive Radios," *IEEE Transactions on Mobile Computing*, vol. 10, no. 2, pp. 216-227, 2011, proposed three rendezvous algorithms, namely GOS (Generated Orthogonal Sequence), MC (Modular Clock), and MMC (Modified MC). GOS gives guaranteed rendezvous when two users have the same set of available channels. Although MC/MMC cannot guarantee rendezvous of two users in finite time, simulations show that they give shorter TTR in most cases, compared with other algorithms. Shin, Yang, and Kim in J. Shin, D. Yang, and C. Kim, "A Channel Rendezvous Scheme for Cognitive Radio Networks," *IEEE Communications Letters*, vol. 14, no. 10, pp. 954-956, 2010, proposed an efficient CH algorithm called CRSEQ (Channel Rendezvous SEQuence), which is based on triangle numbers and modulo operations. In H. Liu, Z. Lin, X. Chu, and Y.-W. Leung, "Jump-Stay Rendezvous Algorithm for Cognitive Radio Networks," *IEEE Transactions on Parallel and Distributed Systems*, vol. 23, no. 10, pp. 1867-1881, 2012, the present inventors proposed a jump-stay (JS) algorithm in which a user alternately "jumps" on available channels and "stays" on a specific channel. With the assumption that each user has a unique ID (e.g., the MAC address), Bian and Park in K. Bian and J.-M. Park, "Maximizing Rendezvous Diversity in Rendezvous Protocols for Decentralized Cognitive Radio Networks," *IEEE Transactions on Mobile Computing*, designed an asynchronous channel-hopping (ACH) algorithm which maximizes rendezvous diversity. Though the length of user ID is a constant, it may result in a long TTR in practice given that a typical MAC address contains 48 bits. Performance of these algorithms is summarized in Table 1.

Based on the previous JS algorithm disclosed in H. Liu, Z. Lin, X. Chu, and Y.-W. Leung, "Jump-Stay Rendezvous Algorithm for Cognitive Radio Networks," *IEEE Transactions on Parallel and Distributed Systems*, vol. 23, no. 10, pp. 1867-1881, 2012, the present inventors propose an enhanced jump-stay (EJS) algorithm. Compared with JS, EJS lowers the upper-bounds of both MTTR and E(TTR) from $O(P^3)$ (According to the Bertrand-Chebyshev theorem, it is confirmed that $M>P/2$ and $O(MP^2)=O(P^3)$) to $O(P^2)$ under the asymmetric model, with a cost of a slightly larger MTTR (the same order of $O(P)$) under the symmetric model (shown in Table 1). EJS advances the state of the art in the sense that it gives the overall smallest theoretical upper-bounds of MTTR and E(TTR) without any additional information such as user IDs.

TABLE 1

| | | Upper-bounds of MTTR and E(TTR) | | | |
|---|---|---|---|---|---|
| | Additional | MTTR | | E(TTR) | |
| Algorithms | requirement | Sym. | Asym. | Sym. | Asym. |
| EJS | Null | 4P | 4P(P + 1 − G) | 3P/2 + 3 | 4P(P + 1 − G) − [4PG(P − G) + G/2]/($m_1 m_2$) |
| JS [4] | Null | 3P | 3MP(P − G) + 3P | 5P/3 + 3 | 2MP(P − G) + (M + 5 − P − (2G − 1)/M)P |
| GOS [2] | Null | M(M + 1) | non-applicable | ($M^4$ + $2M^2$ + 6M − 3)/3($M^2$ + M) | non-applicable |
| CRSEQ [3] | Null | ≥$3P^2$ − 4P + 1 ≤P(3P − 1) | P(3P − 1) | unknown | unknown |
| ACH [5] | User ID | >4 $nM^2$ ≤6 $nM^2$ | 6 $nM^2$ | O(M) | unknown |

Remarks: 1) "Sym." and "Asym." are short for symmetric model and asymmetric model, respectively. Symmetric model: All users have the same available channels. Asymmetric model: Different users might have different available channels but share at least one commonly-available channel. 2) MC/MMC is excluded in Table 1 since it cannot give guaranteed rendezvous. 3) M is the size of the whole potential available channel set; P is the smallest prime number greater than M in JS and EJS, but M−1 in CRSEQ; $m_1$ and $m_2$ are the numbers of channels available to user 1 and user 2 respectively; G is the number of channels commonly-available to the two users; n is the length of user ID in bits. 4) It was proved in H. Liu, Z. Lin, X. Chu, and Y.-W. Leung, "Jump-Stay Rendezvous Algorithm for Cognitive Radio Networks," *IEEE Transactions on Parallel and Distributed Systems*, vol. 23, no. 10, pp. 1867-1881, 2012 that the MTTR of CRSEQ under the symmetric model is not less than $3P^2-4P\times1$. 5) It was also proved that the MTTR of ACH under the symmetric model is greater than 4 $nM^2$.

In one embodiment of the present invention, the invention is advantageous in that it is able to provide a method for achieving rendezvous for cognitive radio networks using an enhanced jump-stay (EJS) rendezvous method. EJS lowers the upper-bounds of both the maximum time-to-rendezvous (MTTR) and the expected time-to-rendezvous (E(TTR)) from $O(P^3)$ to $O(P^2)$ under the asymmetric model, while keeping the same order $O(P)$ of upper-bounds of MTTR and E(TTR) under the symmetric mode, where P is the smallest prime number greater than the total number of channels in a cognitive radio network.

The present invention is not to be limited in scope by any of the specific embodiments described herein. The following embodiments are presented for exemplification only.

With reference to FIGS. 1 and 2, there is provided a method for achieving rendezvous in a multiple access network having two or more access channels comprising the steps of: generating channel access sequences in rounds for each user of the multiple access network, wherein each round includes at least one jump-pattern and at least one stay-pattern; performing the at least one jump-pattern alternated by the at least one stay-pattern in each round, and whereupon the at least one jump-pattern alternated by the stay-pattern in each round are performed, continuously generate at least one channel access sequence rounds and performing the jump-pattern of the channel access sequence rounds until a user in the network achieves rendezvous with its intended neighbour user or users.

In one embodiment, the present invention provides a method for achieving rendezvous for cognitive radio networks using an enhanced jump-stay (EJS) rendezvous method which may be implemented as software, hardware or partially software and hardware for use with an electric controller, programmable array, computer processor, computing device, or as part of a transceiver device on a radio arranged to operate with or for a cognitive radio or for an apparatus for use in a cognitive radio network. In this way, a programmed system or implemented by electronic logic in the forms of software, hardware or both may form, in one example embodiment a 11. A system for achieving rendezvous in a multiple access network having two or more access channels comprising: —a channel access sequence generator arranged to generate channel access sequences in rounds for each user of the multiple access network, wherein each round includes at least one jump-pattern and at least one stay-pattern; —a processor arranged to perform the at least one jump-pattern alternated by the at least one stay-pattern in each round, and whereupon the at least one jump-pattern alternated by the stay-pattern in each round are performed, continuously generate at least one channel access sequence rounds and—a module arranged to perform the jump-pattern of the channel access sequence rounds until a user in the network achieves rendezvous with its intended neighbour user or users.

In one embodiment of the present invention, the EJS method is better than other similar method such that it lowers the upper-bounds of both the maximum time-to-rendezvous (MTTR) and the expected time-to-rendezvous (E(TTR)) from $O(P^3)$ to $O(P^2)$ under the asymmetric model, while keeping the same order $O(P)$ of upper-bounds of MTTR and E(TTR) under the symmetric mode, where P is the smallest prime number greater than the total number of channels in a cognitive radio network. Furthermore, in another embodiment of the present invention, the proposed EJS method gives guaranteed rendezvous under both the symmetric model and the asymmetric model, wherein cognitive radio network users may have different available channels. In yet a third embodiment of the present invention, the proposed EJS method does not assume any sender/receiver role, which makes it applicable for applications such as "neighbor discovery". In a fourth embodiment of the present invention, the proposed EJS method is applicable to cognitive radio networks without central controllers, e.g. blind rendezvous. In a fifth embodiment of the present invention, the proposed EJS method is for blind rendezvous and works without using any control channels and/or central controllers.

It is herein considered a CRN consisting of K≥2 users, who coexist with several primary users (PUs) in the same geographical area. The PUs are the owners of some licensed spectrum, which can be divided into M>1 non-overlapping channels $C=\{c_1, c_2, \ldots, c_M\}$, where $c_i$ denotes the $i^{th}$ channel (channel i). Each user in the CRN is equipped with one cognitive radio, which can access the idle channels in C opportunistically. Let $C_k \subseteq C$ denote the set of channels available to user k (k=1, 2, ..., K), where a channel is available to a user if the user can communicate on the channel without causing interference to PUs. $C_k$ could be determined at user k by spectrum sensing.

Two models of channel availability are considered: 1) Symmetric model. All users have the same available channels. 2) Asymmetric model. Different users might have different available channels but share at least one commonly-available channel. Both the symmetric and asymmetric models are important in practice. For example, the symmetric model is suitable for users who are located in the relatively small area while the asymmetric model is applicable if users' geographical locations are far. The aim of this work is to design an efficient CH method for rendezvous of users under both the symmetric and asymmetric models.

Enhanced Jump-Stay Method

The proposed EJS method generates CH sequence in rounds. Each round consists of one jump-pattern and one stay-pattern. Intuitively, users continuously "jump" on available channels during the jump-pattern while "stay" on a specific channel during the stay-pattern. A user performs the jump-pattern first and then the stay-pattern in each round.

To generate the two patterns in a round, a user needs to determine three integers: P (the smallest prime number greater than M), r (an integer in [1, M]) and i (an integer in [1, P]). The jump-pattern lasts for 3P timeslots and the subsequent stay-pattern lasts for P timeslots. In the jump-pattern, the user starts with index i and keeps jumping (hopping) in [1, P] with step-length r by using the modulo operations on P. In the subsequent stay-pattern, the user stays on channel r, which is the step-length of this round. In FIG. 1, it is presented a function called EJSHopping, which determines the channel in timeslot t.

In EJS, each user continuously calls EJSHopping to generate its CH sequence until it achieves rendezvous with its potential neighbor. FIG. 2 gives the pseudo code of EJS. In line 3, each user randomly selects step-length r from the indices of its available channels. In line 8, starting-index i is switched to the next number every round (4P timeslots) in the round-robin fashion. In line 10, if channel $c_j$ (computed by EJSHopping) does not belong to $C_k$, it is replaced by the $((j-1) \mod |C_k|)+1)^{th}$ channel in $C_k$ (The channels in $C_k$ are sorted in the ascending order according to their indices) so as to increase chance of rendezvous. For example, given $C_k=\{c_1, c_3, c_4\}$ and j=5, since $c_5$ does not belong to $C_k$, it is replaced by $c_3$ (Here, $((j-1) \mod |C_k|)+1)=2$ and $c_3$ is the $2^{nd}$ channel in $C_k$).

Illustration Examples and Discussion

Suppose that there are M=2 channels. Thus, P should be equal to 3. The available channels of user 1 and user 2 are $C_1=\{c_1, c_2\}$ and $C_2=\{c_2\}$, respectively. FIG. 3 demonstrates the CH sequences of the two users performing EJS. To reveal the essence of the EJS sequences, it is presented the sequences without the replacement operation (line 10 of FIG. 2).

Figure 4:
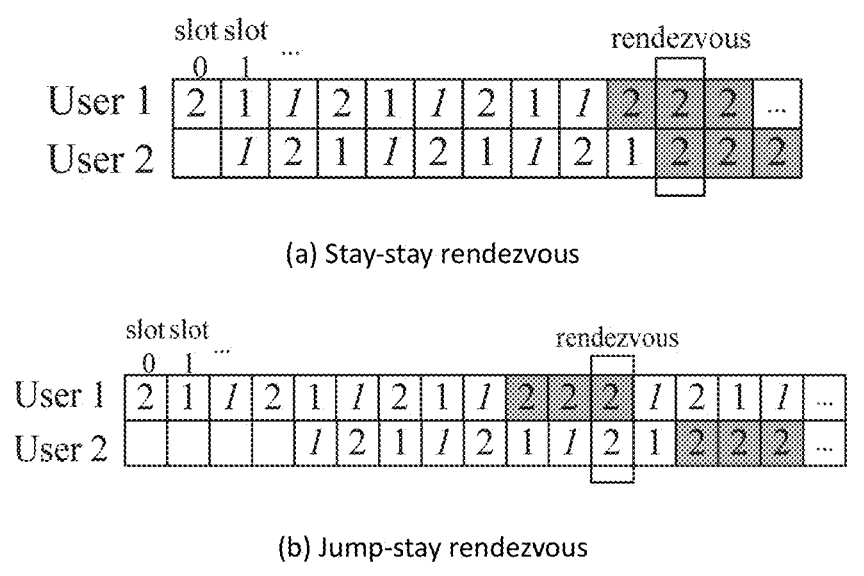

With the CH sequences in FIG. 3, users 1 and 2 can achieve rendezvous under various scenarios, as illustrated in FIGS. 4 and 5. Particularly, FIG. 5 illustrates an important property of EJS that two users performing EJS are able to achieve potential rendezvous on each of channels in C (i.e., the whole channel set) so as to provide guaranteed rendezvous, where a potential rendezvous means that the two users attempt rendezvous on the same channel at the same time. A potential rendezvous becomes successful (i.e., rendezvous is realized) only if this channel is commonly-available to both users.

Both EJS and JS [4] employ the jump-pattern and the stay-pattern. However, EJS makes the following non-trivial changes to JS. 1) New sequence structure: The length of each round of EJS is selected in a counter-intuitive manner. Intuitively, longer length of each round would result in slower rendezvous. However, EJS increases the length of each round from 3P (used by JS) to 4P and it is proved to give faster rendezvous. 2) New hopping sequence: Using the new sequence structure, EJS re-designs the hopping sequence as follows. EJS uses a fixed step-length r for all rounds while JS adjusts step-length r every round. Moreover, EJS uses only the index of the available channel as the step-length while JS may use the index of the available or unavailable channel as the step-length. Furthermore, EJS adjusts starting-index i every 4P timeslots while JS adjusts this index every 3 MP timeslots. Based on these changes, EJS makes improvement over JS under the asymmetric model. This fact is demonstrated in FIGS. 4 and 5, and is rigorously proved in Theorems 3 and 4 in the next section.

Theoretical Analysis

Theorem 1. Under the symmetric model, any two users performing EJS achieve rendezvous in at most 4P timeslots, where P is the smallest prime number greater than M.

Proof: The proof is given in PROOFS.

Theorem 2. Under the symmetric model, E(TTR) of EJS is upper-bounded by 3P/2+3, where P is the smallest prime number greater than M.

Proof: The proof is given in PROOFS.

Theorem 3. Under the asymmetric model, any two users performing EJS achieve rendezvous in at most 4P(P+1−G) timeslots, where P is the smallest prime number greater than M and G is the number of channels commonly-available to the two users.

Proof: The proof is given in PROOFS.

Theorem 4. Under the asymmetric model, E(TTR) of EJS is upper-bounded by $4P(P+1-G)-[4PG(P-G)+G/2]/(m_1 m_2)$, where P is the smallest prime number greater than M, $m_1$ ($m_2$) is the number of channels available to user 1 (user 2), and G is the number of channels commonly-available to the two users.

Proof: The proof is given in PROOFS.

One Example of a Simulated operation of a method in accordance with one embodiment of the present invention In this example, software Matlab 7.9 is used to implement the one embodiment of the EJS method. GOS, CRSEQ, JS, and ACH are selected as baseline algorithms for comparison. Both the symmetric and asymmetric models are considered. In the simulation under the asymmetric model, let M be 40 and each user has 20 available channels. The available channels of each user are randomly generated. Let's vary the number of channels commonly-available to both users, i.e., G, from 2 to 20. In ACH, each user ID is a 48-bit sequence, which is randomly generated. For fairness, the replacement operation (line 10 in FIG. 2) is not applied in EJS and JS since CRSEQ and ACH have no such operation. Notice that both EJS and JS provide guaranteed rendezvous under the asymmetric model without relying on the replacement operation. FIG. 6(a) presents the average TTR (the mean of $5 \times 10^5$ separate runs), which is an approximation to E(TTR). It can be seen that average TTRs of JS and EJS are significantly smaller than those of ACH and CRSEQ, and EJS performs best when G is greater than 4. FIG. 6(b) shows the MTTR which is the maximum TTR in $5 \times 10^5$ separate runs. EJS gives the smallest MTTR when G is greater than 4 and performs close to CRSEQ when G is less than or equal to 4.

The embodiments of this invention are advantageous in that it provides an Enhanced Jump-Stay (EJS) method for rendezvous of cognitive users. Without information of user IDs, the proposed EJS method has been proven to give guaranteed rendezvous with the overall best upper-bounds of MTTR and E(TTR).

Proofs

Without loss of generality, it is assumed that user 1 begins performing EJS not later than user 2. Let user k's step-length be $r_k$ (k=1, 2).

Proof of Theorem 1. We discuss the following two cases.

Case 1: $r_1=r_2=r$ (refer to FIG. 7). Notice that, when user 2 starts hopping, it should be in jump-pattern, but user 1 may be in either jump-pattern or stay-pattern. Let L be the length of overlap between user 1's jump-pattern/stay-pattern and user 2's jump-pattern. It is thus considered four subcases as follows.

Subcase 1-a: user 1 in jump-pattern and L>2P. As shown in FIG. 7(a), an overlap must exist between user 1's and user 2's stay-patterns. Since both users stay on the same channel r in the stay-patterns, thus have TTR≤3P+1.

Subcase 1-b: user 1 in jump-pattern and L≤2P. As shown in FIG. 7(b), there must be a P-timeslot overlap between user 1's stay-pattern and user 2's jump-pattern. In these overlapping P timeslots, user 2 will stay on channel r, while user 2, according to Lemma 1 in H. Liu, Z. Lin, X. Chu, and Y.-W. Leung, "Jump-Stay Rendezvous Algorithm for Cognitive Radio Networks," *IEEE Transactions on Parallel and Distributed Systems*, vol. 23, no. 10, pp. 1867-1881, 2012, will visit all the channels (including channel r). Thus, rendezvous must be achieved in one of these P timeslots, i.e., have TTR≤L+P≤3P.

Subcase 1-c: user 1 in stay-pattern and L=P. As shown in FIG. 7(c), since L=P, using similar argumentation in subcase 1-b, it can be easily inferred that TTR≤P.

Subcase 1-d: user 1 in stay-pattern and L<P. As shown in FIG. 7(d), since L<P, user 2's stay-pattern must overlap with user 1's stay-pattern in the next round. Thus, have TTRL≤L+3P+1≤4P.

Case 2: $r_1 \neq r_2$ (refer to FIG. 8). Similar to Case 1, let's consider the following four subcases.

Subcase 2-a: user 1 in jump-pattern and L≥P. As shown in FIG. 8(a), since user 1 and user 2 adopt different step-lengths in their jump-patterns, and the overlap between user 1's and user 2's jump-patterns exceeds P timeslots, according to Lemma 2 in H. Liu, Z. Lin, X. Chu, and Y.-W. Leung, "Jump-Stay Rendezvous Algorithm for Cognitive Radio Networks," *IEEE Transactions on Parallel and Distributed Systems*, vol. 23, no. 10, pp. 1867-1881, 2012, a rendezvous must happen in one of the first P overlapping timeslots. Thus, have TTR≤P.

Subcase 2-b: user 1 in jump-pattern and L<P. As shown in FIG. 8(b), since L<P, there must be P timeslots overlapping between user 1's stay-pattern and user 2's jump-pattern. Using similar argumentation in subcase 1-b, we have TTR≤L+P<2P.

Subcase 2-c: user 1 in stay-pattern and L=P. As shown in FIG. 8(c), similar to subcase 1-c, it can be inferred that TTR≤P.

Subcase 2-d: user 1 in stay-pattern and L<P. As shown in FIG. 8(d), because L<P, the first P timeslots in the next round of user 1 (jump-pattern) must overlap with user 2's jump-pattern. Since the step-lengths of both users are different, according to Lemma 2 in H. Liu, Z. Lin, X. Chu, and Y.-W. Leung, "Jump-Stay Rendezvous Algorithm for Cognitive Radio Networks," *IEEE Transactions on Parallel and Distributed Systems*, vol. 23, no. 10, pp. 1867-1881, 2012, a rendezvous must appear in one of these P overlapping timeslots. Thus, have TTR≤L+P<2P.

To sum up, the TTR of EJS under the symmetric model can be upper-bounded by 4P.

Proof of Theorem 2. Since step-length r is in [1, M], two users select the same step-length and different step-lengths with probabilities 1/M and (M−1)/M, respectively. Furthermore, the length of jump-pattern is 3P timeslots and that of stay-pattern is P timeslots in every round. Thus, when user 2 starts its hopping, user 1 may be in its jump-pattern and stay-pattern with probabilities 3/4 and 1/4, respectively. Based on these observations, it is computed the occurrence probabilities of eight subcases analyzed in the proof of Theorem 1 as follows.

Subcase 1-a (FIG. 7(a)): 1/M×(3/4)×(P−1)/3P (denoted by $p_{1a}$);

Subcase 1-b (FIG. 7(b)): 1/M×(3/4)×(2P+1)/3P (denoted by $p_{1b}$);

Subcase 1-c (FIG. 7(c)): 1/M×(1/4)×1/P (denoted by $p_{1c}$);

Subcase 1-d (FIG. 7(d)): 1/M×(1/4)×(P−1)/P (denoted by $p_{1d}$);

Subcase 2-a (FIG. 8(a)): (M−1)/M×(3/4)×(2P+1)/3P (denoted by $p_{2a}$);

Subcase 2-b (FIG. 8(b)): (M−1)/M×(3/4)×(P−1)/3P (denoted by $p_{2b}$);

Subcase 2-c (FIG. 8(c)): (M−1)/M×(1/4)×1/P (denoted by $p_{2c}$);

Subcase 2-d (FIG. 8(d)): (M−1)/M×(1/4)×(P−1)/P (denoted by $p_{2d}$).

Combining the occurrence probabilities and the upper-bounded TTRs of the above eight subcases, we derive an upper-bound of the E(TTR) of EJS under the symmetric model as follows.

$$E(TTR) \leq p_{1a} \times (3P+1) + p_{1b} \times (3P) + p_{1c} \times (P) + p_{1d} \times (4P) + p_{2a} \times (P) + p_{2b} \times (2P) + p_{2c} \times (P) + p_{2d} \times (2P) = 3P/2 + 7P/(4M) - 1/2 - 1/(4MP)$$

Since P is the smallest prime number greater than M, according to the Bertrand-Chebyshev theorem, we know P<2M. Then, we can further upper-bound E(TTR) as follows.

$$E(TTR) \leq 3P/2 + 7 \times 2M/(4M) - 1/2 = 3P/2 + 3.$$

Proof of Theorem 3. We discuss the following two cases.

Case 1: $r_1=r_2=r$. Using the exactly same way for analyzing Case 1 in the proof of Theorem 1, it can be inferred that TTR is at most 4P in this case.

Case 2: $r_1 \neq r_2$. Suppose that user 1 is in round q (q≥0) when user 2 starts hopping (i.e., in round 0). Let L be the length of overlap between user 1's jump-pattern in round q and user 2's jump-pattern in round 0. Notice that L may be zero, since user 1 may be in stay-pattern when user 2 starts hopping. Let's discuss the following two subcases: L≥P and L<P.

Figure 9:
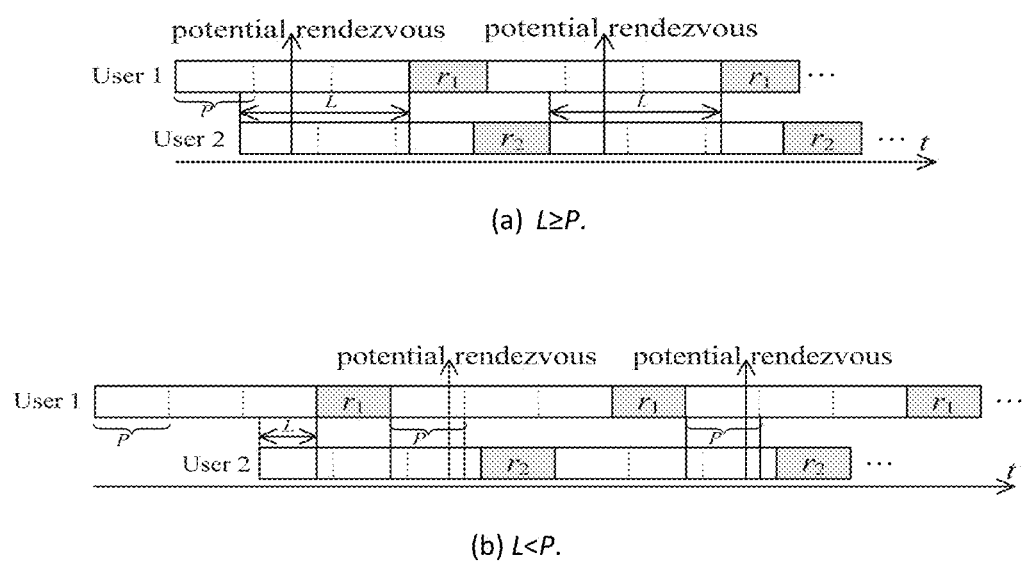
FIG. 9 shows the potential rendezvous under the asymmetric model: Two users adopt different step-lengths, i.e., $r_1 \neq r_2$.

Subcase 2-a: L≥P. As shown in FIG. 9(a), since L≥P and $r_1 \neq r_2$, according to Lemma 2 in H. Liu, Z. Lin, X. Chu, and Y.-W. Leung, "Jump-Stay Rendezvous Algorithm for Cognitive Radio Networks," *IEEE Transactions on Parallel and Distributed Systems*, vol. 23, no. 10, pp. 1867-1881, 2012, a potential rendezvous (short for p-rendezvous) must happen in one of the first P timeslots of user 2 (user 2 being in round 0). Without loss of generality, let this (first) p-rendezvous be on channel j. After 4P timeslots from this p-rendezvous, users 1 and 2 will enter into their jump-patterns of round q+1 and round 1, respectively. Notice that, each user switches the starting-index to the next number in [1, P] every round, meanwhile keeping the step-length unchanged. Hence, after 4P timeslots from the last p-rendezvous, a new p-rendezvous must be achieved on the next channel with index of (j mod P)+1. Inductively, there should be exactly P times of p-rendezvous on M different channels in the first P consecutive rounds of user 2. Since the two users have G commonly-available channels and each round consists of 4P timeslots, the TTR will not exceed 4P(P−G)+4P=4P(P+1−G) (see example in FIG. 5(a)).

Subcase 2-b: L<P. As shown in FIG. 9(b), we can analyze this case in a similar way to subcase 2-a, obtaining an upper-bound of TTR 4P(P+1−G) (see example in FIG. 5(b)).

To sum up, the TTR of EJS under the asymmetric model can be upper-bounded by Max{4P, 4P(P+1−G)}=4P(P+1−G).

Proof of Theorem 4. Since user 1 and user 2 have $m_1$ and $m_2$ available channels, respectively, and they share G channels, they can select the same step-length (i.e., $r_1=r_2$) with probability $G/(m_1 m_2)$ and different step-lengths (i.e., $r_1 \neq r_2$) with probability $1-G/(m_1 m_2)$. Thus, we have $$E(TTR) = G/(m_1 m_2) \times E(TTR|r_1=r_2) + (1-G/(m_1 m_2)) \times E(TTR|r_1 \neq r_2).$$

According to the proof of Theorem 3, when both users select the same step-length, their rendezvous is exactly same as that under the symmetric model. Thus, similar to the proof of Theorem 2, we derive an upper-bound of $E(TTR|r_1=r_2)$ as $E(TTR|r_1=r_2) \leq (13P^2-2P-1)/(4P)$. When both users select different step-lengths, according to the proof of Theorem 3 (Case 2), we have $E(TTR|r_1 \neq r_2) \leq 4P(P+1-G)$. Thus, it is obtained $$E(TTR) \leq$$
$$G/(m_1 m_2) \times (13P^2 - 2P - 1)/(4P) + (1 - G/(m_1 m_2)) \times 4P(P+1-G) =$$
$$4P(P+1-G) - [PG(4P - 4G + 3/4) + G/2]/(m_1 m_2) \leq$$
$$4P(P+1-G) - [4PG(P-G) + G/2]/(m_1 m_2).$$

Modifications and variations such as would be apparent to a skilled addressee are deemed to be within the scope of the present invention.

Unlike the disclosures found in U.S. Pat. No. 8,155,127B2, embodiments of the proposed EJS method are advantageous in that some example embodiments may always give a guaranteed rendezvous, and unlike the prior art in US patent no. US20080317062A1, the proposed EJS method is for blind rendezvous and works without using any control channels and/or central controllers.

Citation or identification of any reference in this section or any other section of this application shall not be construed as an admission that such reference is available as prior art for the present application.

INDUSTRIAL APPLICABILITY

The present invention relates to method for achieving rendezvous for cognitive radio networks. In particular, the present invention relates to method for achieving rendezvous for cognitive radio networks using an enhanced jump-stay (EJS) rendezvous method. EJS lowers the upper-bounds of both the maximum time-to-rendezvous (MTTR) and the expected time-to-rendezvous (E(TTR)) from $O(P^3)$ to $O(P^2)$ under the asymmetric model, while keeping the same order $O(P)$ of upper-bounds of MTTR and E(TTR) under the symmetric mode, where P is the smallest prime number greater than the total number of channels in a cognitive radio network. The present invention provides an efficient method to achieve rendezvous in cognitive radio networks.

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extend. All publications recited herein are hereby incorporated by reference in their entirety.

Those skilled in the art will appreciate that the invention described herein is susceptible to variations and modifications other than those specifically described.

The invention includes all such variation and modifications. The invention also includes all of the steps and features referred to or indicated in the specification, individually or collectively and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

What we claim:

1. A method for achieving rendezvous in a multiple access network having two or more access channels comprising the steps of:
    generating channel access sequences in rounds for each user of the multiple access network, wherein each round includes at least one jump-pattern and at least one stay-pattern; and
    performing the at least one jump-pattern alternated by the at least one stay-pattern in each round, whereupon the at least one jump-pattern alternated by the stay-pattern in each round are performed, continuously generate at least one channel access sequence rounds and perform the jump-pattern of the channel access sequence rounds until a user in the network achieves rendezvous with its intended neighbour user or users;
    wherein when the user that achieves rendezvous with its intended neighbour user or users generates the at least two patterns in each round, the jump-pattern lasts for at least 3P timeslots and the stay-pattern lasts for at least P timeslots;
    wherein when the user performs the jump-pattern, the user starts with index i and keeps jumping/hopping/accessing in [1,P] with a step-length of at least r by using modulo operations on P; and
    wherein in the stay-pattern, the user stays in the channel r, which is the step-length of the respective round, such that P is the smallest prime number greater than M, wherein M is an integer and M denotes the size of the whole potential available channel set, r is an integer in [1, M] and i is an integer in [1,P].

2. The method according to claim 1, wherein each user randomly selects step-length r from the indices of its available channels.

3. The method according to claim 1, wherein the starting-index i is switched to the next number in at least every 4P timeslots in an ordered fashion.

4. The method according to claim 3, wherein the ordered fashion comprising a round robin fashion.

5. The method according to claim 1, wherein if a channel $c_j$ computed by the method does not belong to $C_k$, it is replaced by the $((j-1) \bmod |C_k|+1)^{th}$ channel in $C_k$, wherein $C_k$ denotes the set or subset of channels $\{c_1, c_2, \ldots, c_M\}$ available to user k, wherein j is an integer and $c_j$ denotes the $j^{th}$ channel.

6. The method according to claim 1, wherein the multiple access network is a cognitive radio network.

7. The method according to claim 1, wherein the channel access sequences are channel hopping sequences.

8. The method according to claim 1, wherein the method is implemented in software and/or hardware via computing logics.

9. A system for achieving rendezvous in a multiple access network having two or more access channels comprising:
    at least one channel access sequence generator arranged to generate channel access sequences in rounds for each user of the multiple access network, wherein each round includes at least one jump-pattern and at least one stay-pattern;
    at least one processor arranged to perform the at least one jump-pattern alternated by the at least one stay-pattern in each round, and whereupon the at least one jump-pattern alternated by the stay-pattern in each round are performed, continuously generate at least one channel access sequence rounds and at least one module arranged to perform the jump-pattern of the channel access sequence rounds until a user in the network achieves rendezvous with its intended neighbour user or users;

wherein when the user that achieves rendezvous with its intended neighbour user or users generates the at least two patterns in each round, the jump-pattern lasts for at least 3P timeslots and the stay-pattern lasts for at least P timeslots;

wherein when the user performs the jump-pattern, the user starts with index i and keeps jumping/hopping/accessing in [1,P] with a step-length of at least r by using modulo operators on P; and wherein in the stay-pattern, the user stays in the channel r, which is the step-length of the respective round, such that P is the smallest prime number greater than M, wherein M is an integer and M denotes the size of the whole potential available channel set, r is an integer in [1, M] and i is an integer in [1,P].

10. The system according to claim 9, wherein each user randomly selects step-length r from the indices of its available channels.

11. The system according to claim 9, wherein the starting-index i is switched to the next number in at least every 4P timeslots in an ordered fashion.

12. The system according to claim 11, wherein the ordered fashion comprising a round robin fashion.

13. The system according to claim 9 wherein if a channel $c_j$ computed by the system does not belong to $C_k$, it is replaced by the $((j-1) \bmod |C_k|+1)^{th}$ channel in $C_k$, wherein $C_k$ denotes the set or subset of channels $\{c_1, c_2, \ldots, c_M\}$ available to user k, wherein j is an integer and $c_j$ denotes the $j^{th}$ channel.

14. The system according to claim 9, wherein the system is implemented in software and/or hardware via computing logics.

* * * * *